US012749139B2

(12) United States Patent
Huang et al.

(10) Patent No.: US 12,749,139 B2
(45) Date of Patent: Sep. 29, 2026

(54) COMPUTING SYSTEM AND METHOD FOR GRAPHICS PROCESSOR BOOSTING

(71) Applicant: MEDIATEK INC., Hsinchu City (TW)

(72) Inventors: Po-Yu Huang, Hsinchu City (TW); Shih-Chin Lin, Hsinchu City (TW); Ching-Yi Tsai, Hsinchu City (TW); You-Ming Tsao, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 219 days.

(21) Appl. No.: 18/630,077

(22) Filed: Apr. 9, 2024

(65) Prior Publication Data

US 2024/0386523 A1 Nov. 21, 2024

Related U.S. Application Data

(60) Provisional application No. 63/503,174, filed on May 19, 2023.

(51) Int. Cl.
*G06T 1/20* (2006.01)

(52) U.S. Cl.
CPC .................................... *G06T 1/20* (2013.01)

(58) Field of Classification Search
CPC ........................................................ G06T 1/20
See application file for complete search history.

(56) References Cited

U.S. PATENT DOCUMENTS

2017/0262955 A1* 9/2017 Lin ....................... G06F 1/3206
2018/0284872 A1* 10/2018 Schluessler ........... G06F 1/3265
2019/0043154 A1* 2/2019 Lawrence .............. G09G 5/363
2019/0050049 A1* 2/2019 Qawami .................. G06N 5/04
2022/0253124 A1 8/2022 Venkataraman
2023/0047481 A1 2/2023 Havlir
2023/0077058 A1 3/2023 Bowman
2023/0094384 A1 3/2023 Tikhostoup

FOREIGN PATENT DOCUMENTS

CN 112527513 A 3/2021
CN 114116238 A 3/2022

OTHER PUBLICATIONS

Extended European Search Report dated Oct. 31, 2024, issued in application No. EP 24172646.2.
Chinese language office action dated Dec. 27, 2024, issued in application No. TW 113118576.

* cited by examiner

*Primary Examiner* — Xin Sheng
(74) *Attorney, Agent, or Firm* — McClure, Qualey & Rodack, LLP

(57) ABSTRACT

A computing system with graphics processor boosting is shown. The computing system has a graphics processing unit controlling a display, a code memory storing instructions, and a processor operating the graphics processing unit to control the display. The processor is configured to execute the instructions retrieved from the code memory to implement a plurality of graphics processor boosting modules for the graphics processing unit, and implement an activation controller that controls activation of the different graphics processor boosting modules through different configuration interfaces with balances between the different graphics processor boosting modules.

17 Claims, 5 Drawing Sheets

COMPUTING SYSTEM AND METHOD FOR GRAPHICS PROCESSOR BOOSTING

CROSS REFERENCE TO RELATED APPLICATIONS

This application claims the benefit of U.S. Provisional Application No. 63/503,174, filed May 19, 2023, the entirety of which is/are incorporated by reference herein.

BACKGROUND OF THE INVENTION

Field of the Invention

The present invention relates to graphics processor boosting technologies for a computing system.

Description of the Related Art

Modern mobile devices such as smartphones, tablet computers or other handheld or wearable computing devices provide their human users with a variety of functions such as communication, productivity, and entertainment, enabled in part by software including the mobile device's operating system and numerous available mobile applications ("apps") that can be installed on top of the operating system. Some mobile devices are equipped with a large, high resolution, high refresh rate display that can provide a user with an enhanced visual experience, such as when playing mobile gaming apps on a mobile device.

Nowadays, various mobile apps are available. However, these mobile apps (such as mobile games) with high resolution and high frame-rate requirements may consume a large amount of system resources, which result in considerable consumption of the battery power, and may be beyond the capacity of the mobile platform.

To optimize the utilization of system resources, several graphics processor boosting technologies have been developed. Each graphics processor boosting technology has its own activation control. In the conventional design, the different graphics processor boosting technologies are separately activated by their own logics. Since the activation control of each graphics processor boosting technology may only consider just a little part of the system information, it may fail to consider the big picture of system resource utilization. Moreover, the different graphics processor boosting technologies may conflict with each other.

BRIEF SUMMARY OF THE INVENTION

A control framework is proposed for the various graphics processor boosting technologies of a computing system, which takes multiple criteria into account to have a big picture of the computing system utilization and thereby better control the multiple graphics processor boosting technologies without conflicts among the different graphics processor boosting technologies.

A computing system in accordance with an exemplary embodiment of the disclosure includes a graphics processing unit, a code memory storing instructions, and a processor. The processor operates the graphics processing unit to control a display, and is configured to execute the instructions retrieved from the code memory to implement a plurality of graphics processor boosting modules for the graphics processing unit. The processor also executes the instructions retrieved from the code memory to implement an activation controller that controls activation of the different graphics processor boosting modules through different configuration interfaces with balances between the different graphics processor boosting modules.

In an exemplary embodiment, the activation controller provides an activation control logic that selects target modules to activate from the graphics processor boosting modules. The activation control logic may be further configured to control activation timing of the target modules. In an exemplary embodiment, the activation controller further provides a strength control logic that controls the strength of the target modules.

In an exemplary embodiment, the activation controller controls the activation of the different graphics processor boosting modules based on system information collected by the processor, scene moving information about a scenario movie displayed on the display, user hints, or programmable hints. The scenario movie may refer to game cutscenes, an actual gameplay video, or other graphics rendered by the GPU. The programmable hints are managed in a list wherein different applications are related to different parameter thresholds, and the parameter thresholds are provided to judge the system information, the user hints, or the scene moving information.

In additional to a control module formed by the activation control logic and the strength control logic, the activation controller further includes an information analysis module. The information analysis module is configured to analyze and judge the system information, the user hints, or the scene moving information based on the programmable hints. According to an analysis result of the information analysis module, the control module selects target modules to activate from the graphics processor boosting modules, controls activation timing of the target modules, and controls the strength of the target modules.

In an exemplary embodiment, the control module issues on and off settings to the configuration interfaces to activate the target modules and control activation timing of the target modules. The control module may further issue strength settings to the configuration interfaces to control the strength of the target modules.

In an exemplary embodiment, the activation controller is implemented by a share library, or a driver module, or a process controlling the driver of the computing system.

In an exemplary embodiment, each of the configuration interfaces is implemented by a combination of callback functions, system variables, and configuration files.

In an exemplary embodiment, a method for graphics processor boosting based on the aforementioned concept is introduced.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description lists various embodiments of the present disclosure, but is not intended to limit thereto. The actual scope of the disclosure should be defined according to the scope of the application. The various logics, units, modules, or functional blocks mentioned below may be implemented by a combination of hardware, software, and/or firmware, and may also include special circuits. The various logics, units, modules, or functional blocks are not limited to being implemented separately, but may also be combined together to share certain functions.

Figure 1:
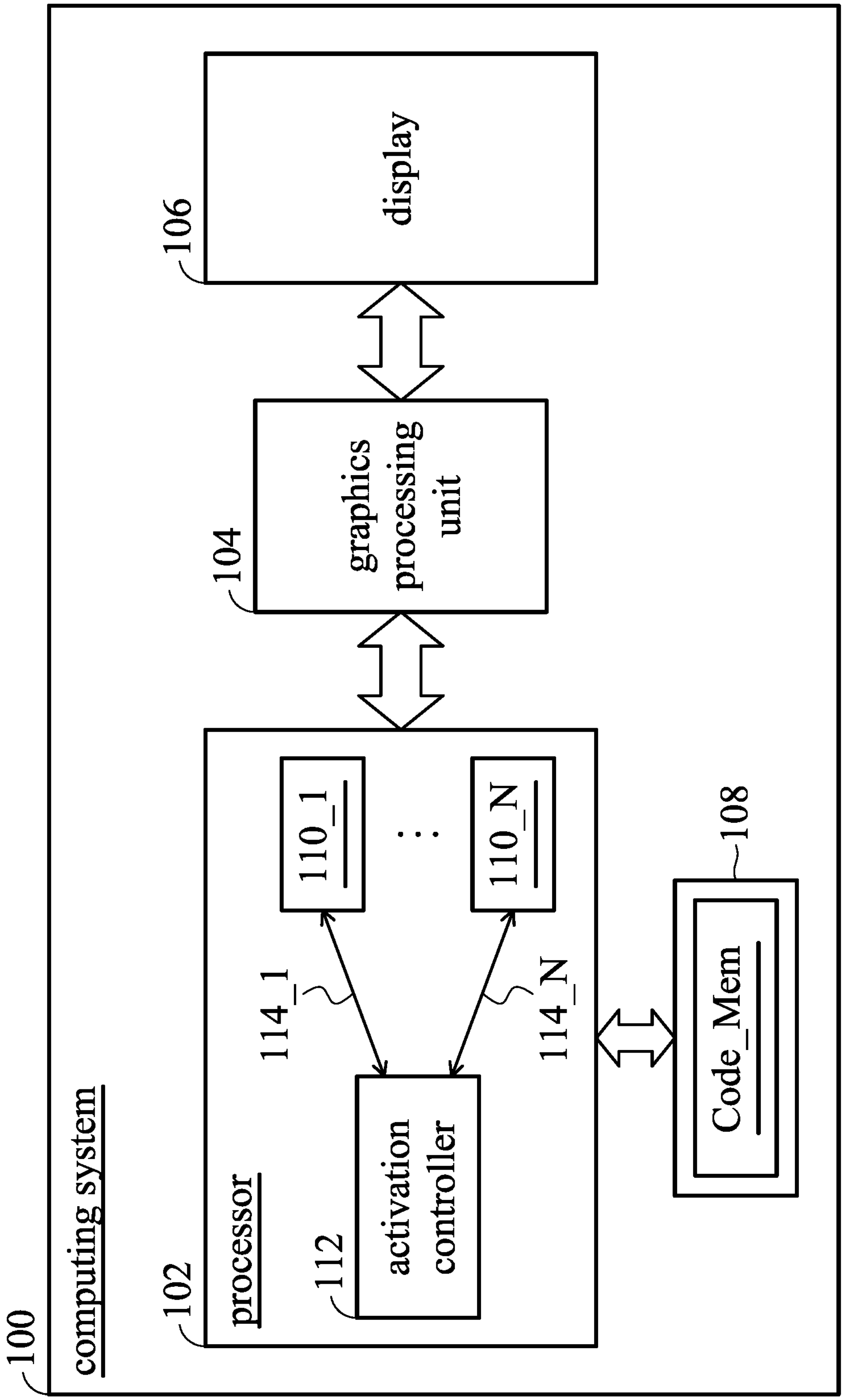
FIG. 1 illustrates a computing system 100 capable of graphics processor boosting in accordance with an exemplary embodiment of the disclosure.

FIG. 1 illustrates a computing system 100 capable of graphics processor boosting in accordance with an exemplary embodiment of the disclosure. The computing system 100 may be any computer device that includes a processor 102 (e.g., a central processing unit CPU, or a microcontroller), a graphics processing unit (GPU) 104, a display 106 (e.g., a touch panel), and a system memory 108. The processor 102 operates the graphics processing unit 104 to control the display 106. In some exemplary embodiments, the computing system 100 is a mobile device such as a smartphone, a tablet computer, or other handheld or wearable computing device.

The system memory 108 may include a code memory Code_Mem storing instructions. The processor 102 is configured to execute the instructions retrieved from the code memory Code_Mem to implement a plurality of graphics processor boosting modules 110_1~110_N for the graphics processing unit 104. The processor 102 further executes the instructions retrieved from the code memory Code_Mem to implement an activation controller 112 that controls activation of the different graphics processor boosting modules 110_1~110_N through different configuration interfaces 114_1~114_N with balances between the different graphics processor boosting modules 110_1~110_N. The processor 102 may introduce novel hardware design corresponding to the graphics processor boosting modules 110_1~110_N and the activation controller 112, but not intend to limit the disclosure thereto. The different graphics processor boosting modules 110_1~110_N relate to the different graphics processor boosting technologies. The activation controller 112 is a control framework for the graphics processor boosting modules 110_1~110_N, which takes multiple criteria into account to have a whole picture of the computing system 100, and thereby makes better control among the different graphics processor boosting modules 110_1~110_N without conflicts between them.

The criteria may be judged based on the system information collected by the processor 102. The system information may be power consumption information (e.g., obtained from a battery status of the computing system 100), or temperature information (e.g. detected by a temperature meter of the computing system 100), or the operational frequency of the processor 102, or the operational frequency of the graphics processing unit 104, or the operational frequency of the system memory 108, or the frame rate of the display 106, or the counting result of the hardware counter of the processor 102.

In some exemplary embodiments, the scene moving information about a scenario movie displayed on the display 106 (e.g., indicating a static display or an animation) is another factor to be considered by the activation controller 112.

In some exemplary embodiments, the display 106 may provide user hints (such as screen positions about the user's touch, or touch events of predefined gestures on the touch panel of the display 106) for the criterion judgment performed by the activation controller 112.

In some exemplary embodiments, the user may define programmable hints to instruct the activation controller 112 to control the graphics processor boosting modules 110_1~110_N. The programmable hints are managed in a list wherein different applications are related to different parameter thresholds, wherein the parameter thresholds are provided to judge the system information, the user hints, or the scene moving information, and are programmable. When the parameter thresholds of the running application are satisfied, the computing system 100 is identified as being at a specific status, which is a hint for the activation controller 112 to control the graphics processor boosting modules 110_1~110_N.

According to the activation controller 112, the target technologies to be activated are selected from the graphics processor boosting modules 110_1~110_N. The activation controller 112 also schedules the timing to turn on the target technologies. In some exemplary embodiment, the activation controller 112 also controls the strength of the target technologies.

In an exemplary embodiment, a shading rate control module (named auto-activated VRS module) implements one of the graphics processor boosting modules 110_1~110_N. The auto-activated VRS module sacrifices the rendering quality of the display to reduce the number of shading operations and suppress the texture bandwidth, and thereby the power consumption of the computing system 100 is reduced to achieve the system resource optimization.

In conventional designs, the auto-activated VRS module is individually activated based on limited information. In the disclosure, the activation controller 112 activates the auto-activated VRS module with balances between the various graphics processor boosting modules 110_1~110_N.

Figure 2:
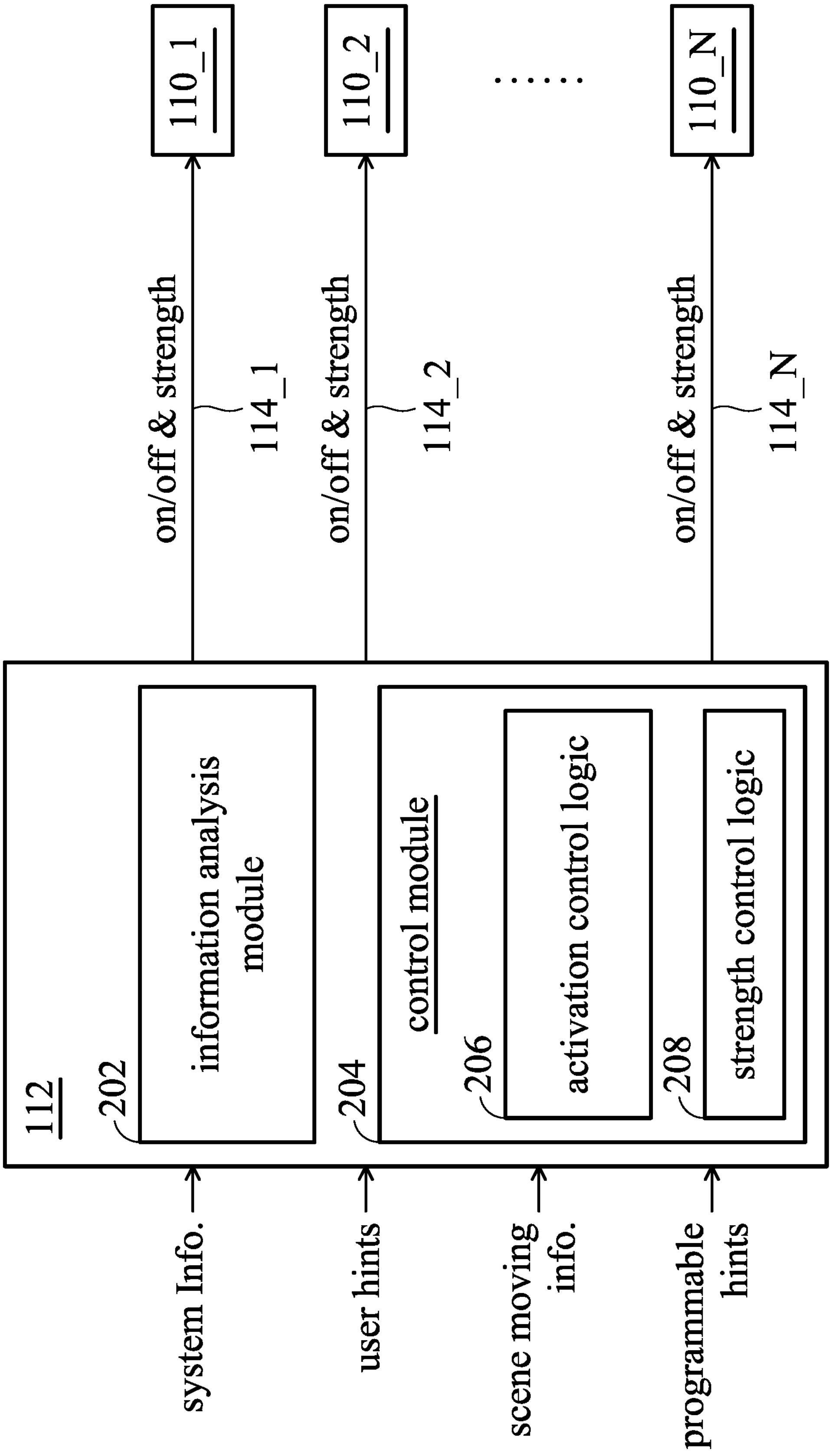
FIG. 2 is a functional block diagram illustrating the activation controller 112 and the multiple graphics processor boosting modules 110_1~110_N in accordance with an exemplary embodiment of the disclosure.

FIG. 2 is a functional block diagram illustrating the activation controller 112 and the multiple graphics processor boosting modules 110_1~110_N in accordance with an exemplary embodiment of the disclosure.

As a system-level control framework, the activation controller 112 may be implemented by a share library, a driver module, a standalone process, etc., which is operated to control the driver of the computing system 100.

The activation controller 112 may run in background, and communicates with the multiple graphics processor boosting modules 110_1~110_N through configuration interfaces 114_1~114_N, respectively. The configuration interfaces 114_1~114_N may be implemented by callback functions, system variables, configuration files, etc. For example, the activation controller 112 may control the aforementioned auto-activated VRS module through system variables or configuration files.

Through the configuration interfaces 114_1~114_N, the activation controller 112 separately turns on/off their corresponding graphics processor boosting modules

110_1~110_N, and even separately controls the strength of the corresponding graphics processor boosting modules 110_1~110_N.

Note that the configuration interfaces 114_1~114_N are simpler than those required in the conventional design. In the conventional design, each graphics processor boosting module 110_#(#is a number) needs an exclusive logic module for system status analysis and module activation. However, in the disclosure, such logic modules for the different graphics processor boosting modules 110_1~110_N are all integrated in the activation controller 112.

As shown, the activation controller 112 includes an information analysis module 202, and a control module 204. The information analysis module 202 is configured to analyze and judge the system information, the user hints, or the scene moving information based on the programmable hints. There is no need to duplicate the same information analysis and judgment to the different configuration interfaces 114_1~114_N. For example, the loading status of the computing system 100 is identified by the information analysis module 202 provided on the activation controller 112. The control module 204 includes an activation control logic 206 and a strength control logic 208. According to the analysis result (e.g., indicating the loading status of the computing system 100) determined by the information analysis module 202, the activation control logic 206 operates to determine the target modules (selected from the graphics processor boosting modules 110_1~110_N) to activate. The activation control logic 206 may further control the activation timing of the target modules. The control module 204 may use the strength control logic 208 to control the strength of the target technologies. By selecting the target modules, controlling the activation timing of the target modules, and controlling the strength of the target modules, the activation controller 112 takes balances between the different graphics processor boosting modules 110_1~110_N.

As shown, the configuration interfaces 114_1~114_N may be configured to simply set the on/off and the strength of their corresponding graphics processor boosting modules 110_1~110_N because the conventional complex analysis and judgment logic modules are integrated in the activation controller 112 to be shared by the different graphics processor boosting modules 110_1~110_N.

In some exemplary embodiments, the control module 204 may issue on and off settings to the configuration interfaces 114_1~114_N to activate the target modules and control activation timing of the target modules. Furthermore, the control module 204 may issue strength settings to the configuration interfaces 114_1~114_N to control the strength of the target modules. In some exemplary embodiments, some of the graphics processor boosting modules 110_1~110_N may share the same control policy. By operating the corresponding logic in the activation controller 112 rather than on the separately provided configuration interfaces, the different graphics processor boosting modules 110_1~110_N are controlled at the same time. There is no need to repeat the calculations for the same control policy. The activation controller 112 with information integration capability can avoid conflicts among the graphics processor boosting modules 110_1~110_N.

The information collected by the activation controller 112 is discussed in details here. As for the user hints, not only the touch events about the user's gestures or touch positions can be used to analyze the status of the computing system 100. If no touch event happens, it means that the user may be watching a scenario movie of game (e.g., cutscenes). It also helps the activation controller 112 to identify the status of the computing system 100. In such a situation, real-time graphics processing is required, and the scenario movie quality may be considerably affected by activation of some graphics processor boosting module 110_#. Thus, the activation controller 112 may not turn on the graphics processor boosting module 110_1~110_N.

The scene moving information (indicating whether the application scene is moving or static) may be collected by analyzing the graphic rendering or computing. The algorithms for the analysis may be an image difference calculation based on peak signal-to-noise ratio (PSNR) or structural similarity (SSIM). For example, when a static image is displayed, the activation controller 112 should disable some graphics processor boosting modules 110_#because the human eyes are sensitive to even slight change on a static image.

By integrating the analysis and judgment of the status of the computing system 100, the graphics processor boosting modules 110_1~110_N are controlled in a holistic view.

In an exemplary embodiment, the aforementioned auto-activated VRS module that implements one of the graphics processor boosting modules 110_1~110_N is activated when the information analysis module 202 determines that the GPU frequency is high (e.g., higher than a threshold defined in the list managed to implement the programmable hints). When determining that the user does not touch the panel for a long time (e.g., analyzed from the user hints), or a static image is displayed on the device (e.g., analyzed from the scene moving information), the activation control logic 206 generally disables the auto-activated VRS module to guarantee the visual experience of the user. However, the activation controller 112 is capable of considering exceptions. When the system information indicates the low battery status or triggers the thermal throttle, the activation control logic 206 may activate the auto-activated VRS module anyway. A better solution for the real status of the computing system 100 is proposed in the disclosure.

In another example, when the information analysis module 202 determines that the memory frequency of the system memory 108 is higher than a threshold, the activation control logic 206 may turn on the auto-activated VRS module to reduce the shading rate and limit the texture bandwidth and thereby saves the memory bandwidth. When the information analysis module 202 determines that low performance problem is due to the high CPU frequency, the activation of the auto-activated VRS module will not help the situation. The activation control logic 206 will not activate the auto-activated VRS module. The auto-activated VRS module is properly controlled in response to the real loading status of the computing system 100.

In some exemplary embodiments, the control module 204 may define multiple levels to operate the strength control logic 208 to control the strength of the target modules based on the status of the computing system 100.

For example, the aforementioned auto-activated VRS module is allowed to be switched between several shading rates. The strength control logic 208 may operate the aforementioned auto-activated VRS module at the lowest shading rate when the computing system 100 operates with heavy loading (e.g. heavier than a predefined criterion). When the information analysis module 202 determines that the loading is reduced to a predefined lower level, the strength control logic 208 may control the auto-activated VRS module to increase the shading rate.

Figure 3:
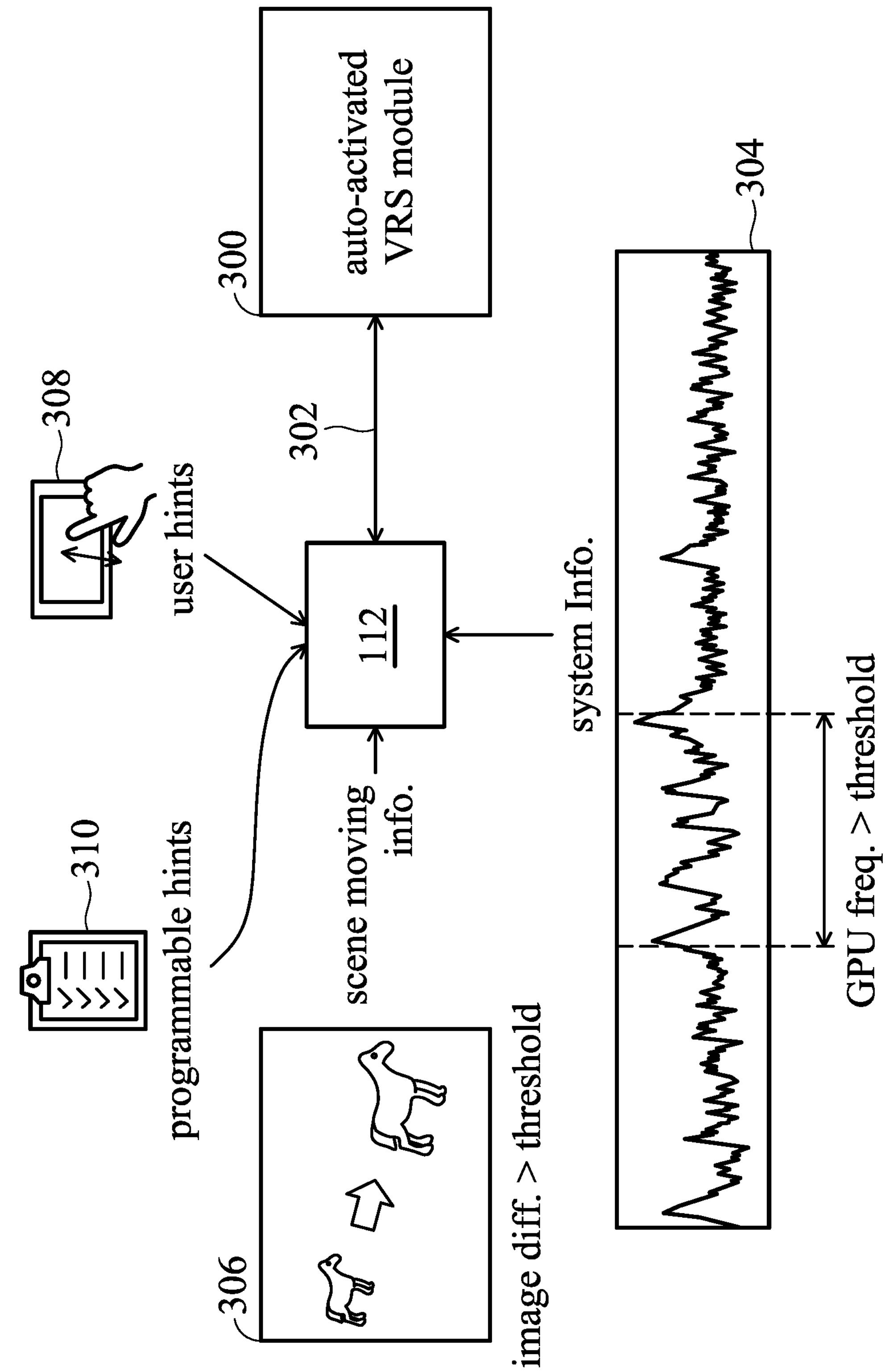
FIG. 3 illustrates how the activation controller 112 operates an auto-activated VRS module 300 in accordance with an exemplary embodiment of the disclosure.

FIG. 3 illustrates how the activation controller 112 operates an auto-activated VRS module 300 in accordance with an exemplary embodiment of the disclosure.

The activation controller 112 communicates with the auto-activated VRS module 300 through a configuration interface 302 that is implemented by system variables or configuration files. Based on the system information 304 that is capable of indicating a high GPU frequency interval (referring to the interval with a GPU frequency greater than a threshold), scene moving information 306 that is capable of indicating an image difference greater than a threshold, user hints 308 that are capable of indicating touch events, and programmable hints 310 that show the parameter thresholds corresponding to the running apps, the activation controller 112 operates the auto-activated VRS module 300 through the configuration interface 302.

In response to a heavy loading situation, or a high temperature situation, or a low battery situation, the activation controller 112 operates the auto-activated VRS module 300 to run at the lowest shading rate. In response to a medium loading situation or a touch event, the activation controller 112 operates the auto-activated VRS module 300 to run at a shading rate just lower than the normal shading rate but not the lowest shading rate. In response to a low loading situation or a static scene, the activation controller 112 operates the auto-activated VRS module 300 to run at its default shading rate.

Such an adequate control of a single graphics processor boosting module can be applied to multiple graphics processor boosting modules.

Figure 4:
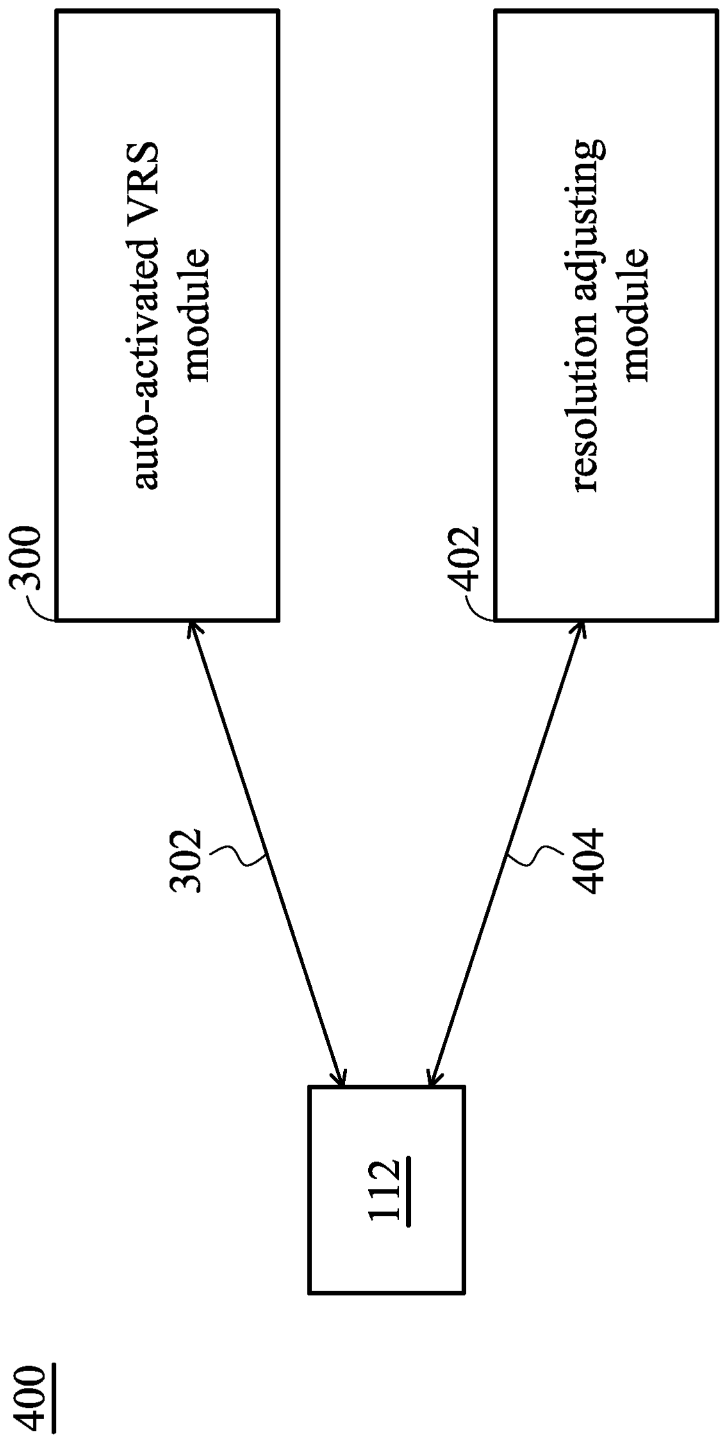
FIG. 4 illustrates a computing system 400 with multiple graphics processor boosting modules in accordance with an exemplary embodiment of the disclosure.

FIG. 4 illustrates a computing system 400 with multiple graphics processor boosting modules in accordance with an exemplary embodiment of the disclosure. In addition to the auto-activated VRS module 300, the computing system 400 further includes a resolution adjusting module 402 which is operated by the activation controller 112 through a configuration interface 404. Compared to the auto-activated VRS module 300, the resolution adjusting module 402 results in fewer impacts on the scenario movie quality and provides the more adjustment levels for fine tuning. Although either the auto-activated VRS module 300 or the resolution adjusting module 402 alleviate the system loading, the auto-activated VRS module 300 that sacrifice the rendering quality more will result in the more significant damage on the display quality of the scenario movie. But, the resolution adjusting module 402 may have the higher system overhead in comparison with the auto-activated VRS module 300, which results in the lower benefit.

In the conventional design, the auto-activated VRS module 300 and the resolution adjusting module 402 both may be fully turned on in response to the heavy loading status of the computing system 400. However, if the auto-activated VRS module 300 and the resolution adjusting module 402 are fully activated at same time, the graphic quality may drop too much. As controlled by the activation controller 112, a balance between the auto-activated VRS module 300 and the resolution adjusting module 402 is achieved.

For example, when the computer system 400 is in the extremely heavy loading status (that requires more system resources than the normal loading status of the computing system 400), the activation controller 112 may activate the auto-activated VRS module 300 but keep the resolution adjusting module 402 disabled to guarantee the system performance first. When the computer system 400 is in the lighter heavy loading status (that requires more system resources than the normal loading status but fewer system resources than the extremely heavy loading status), the activation controller 112 may disable the auto-activated VRS module 300 but activate the resolution adjusting module 402 to maintain the scenario movie quality.

In another exemplary embodiment, when the computer system 400 is in the extremely heavy loading status, the activation controller 112 may activate the auto-activated VRS module 300 to provide the more significant adjustment, but activate the resolution adjusting module 402 to provide the less significant adjustment. When the computer system 400 is in the lightly heavy loading status, the activation controller 112 may activate the auto-activated VRS module 300 to provide the less significant adjustment but activate the resolution adjusting module 402 to provide the more significant adjustment.

In an exemplary embodiment, the shading rate control module 402 provides fewer adjustment levels than the resolution adjusting module 300. Such a design also helps the balances between the two different graphics processor boosting modules.

The solution of the conflict problems between the different graphics processor boosting modules 110_1~110_N is further discussed here. The different graphics processor boosting technologies 110_1~110_N each have its own overhead and profit. The activation controller 112 activates the target modules without conflicts between the different graphics processor boosting modules 110_1~110_N. When more than one target modules are selected to be activated, the strength control logic 208 may control the strength of each target module for balance. This also avoids conflicts between the different graphics processor boosting modules 110_1~110_N.

Note that according to the disclosure the control of the different target modules is based on the status information collected at the same time. It also results in a great improvement of the balances between the different graphics processor boosting modules 110_1~110_N.

The aforementioned concept may be used to implement a method for graphics processor boosting. In an exemplary embodiment, the method includes: providing a plurality of graphics processor boosting modules 110_1~110_N for a graphics processing unit 104 of a computing system 100; and controlling activation of the different graphics processor boosting modules 110_1~110_N through different configuration interfaces 114_1~114_N with balances between the different graphics processor boosting modules 110_1~110_N. Specifically, the method includes integrating analysis and judgment, based on the aforementioned programmable hints, of the aforementioned system information, user hints, or scene moving information before communicating with the graphics processor boosting modules 110_1~110_N through the configuration interfaces 114_1~114_N.

Figure 5:
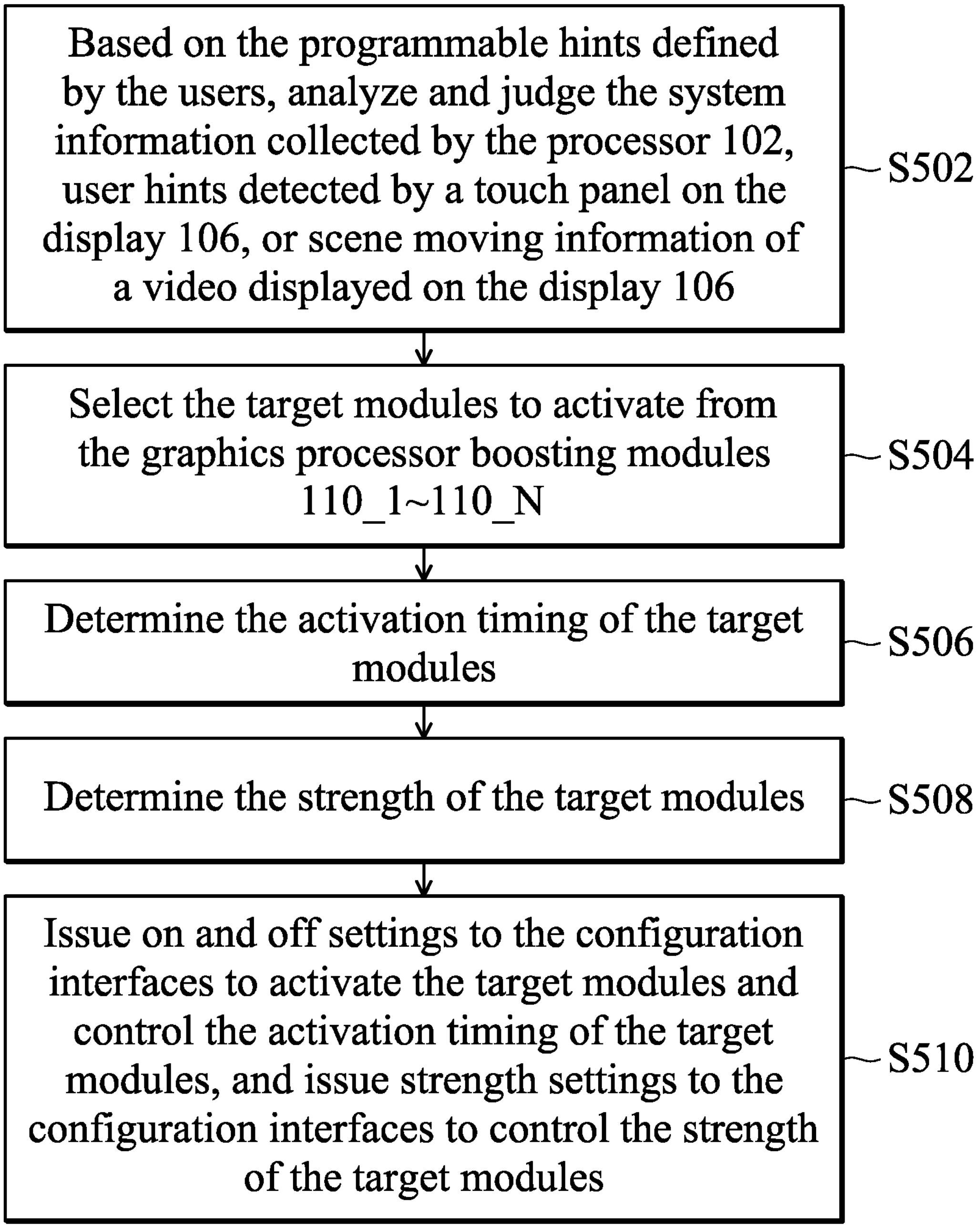
FIG. 5 is a flowchart depicting a method for graphics processor boosting in accordance with an exemplary embodiment of the disclosure.

FIG. 5 is a flowchart depicting a method for graphics processor boosting in accordance with an exemplary embodiment of the disclosure. In step S502, based on the programmable hints defined by the users, the system information collected by the processor 102, user hints detected by a touch panel on the display 106, or scene moving information of a scenario movie displayed on the display 106 are analyzed and judged, wherein the analysis and judgment for the control of the different graphics processor boosting modules 110_1~110_N are integrated together rather than being redundantly repeated for the different graphics processor boosting modules 110_1~110_N. In step S504, the target modules to activate are selected from the graphics processor boosting modules 110_1~110_N. In step S506, the activation timing of the target modules are determined. In step S508, the strength of the target modules are determined. In step S510, on and off settings are issued to the configuration interfaces 114_1~114_N to activate the target modules and controlling the activation timing of the target modules, and strength settings are issued to the configuration interfaces 114_1~114_N to control the strength of the target modules.

There may be minor changes in the aforementioned exemplary embodiments. Any design which integrates the analysis and judgment of the status of a computing system in a module and then use a simple way to communicate with multiple graphics processor boosting modules should be considered within the scope of the invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computing system, comprising:

a graphics processing unit controlling a display;

a code memory, storing instructions; and a processor, operating the graphics processing unit to control the display, and configured to execute the instructions retrieved from the code memory to implement a plurality of graphics processor boosting modules for the graphics processing unit;

wherein the processor further executes the instructions retrieved from the code memory to provide an activation control logic and a strength control logic that control activation of the different graphics processor boosting modules through different configuration interfaces with balances between the different graphics processor boosting modules;

wherein the activation control logic selects target modules to activate from the graphics processor boosting modules, and the strength control logic controls strength of the target modules;

wherein the target modules include a first module and a second module, wherein the first module provides a more significant adjustment to alleviate system loading and causes a more significant impact on display quality in comparison with the second module, and the second module provides a less significant adjustment and has a higher system overhead in comparison with the first module;

wherein in response to a first heavy loading status of the computing system, the strength control logic activates the first module at a stronger level in comparison with the second module; and wherein in response to a second heavy loading status of the computing system that requires fewer system resources than the first heavy loading status, the strength control logic activates the second module at a stronger level in comparison with the first module.

2. The computing system as claimed in claim 1, wherein:

the activation control logic is further configured to control activation timing of the target modules; and the activation control logic controls the activation timing of the target modules.

3. The computing system as claimed in claim 1, wherein:

the activation control logic and the strength control logic control the activation of the different graphics processor boosting modules based on system information collected by the processor.

4. The computing system as claimed in claim 3, wherein:

the system information is power consumption information, or temperature information, or an operational frequency of the processor, or an operational frequency of the graphics processing unit, or an operational frequency of a system memory of the computing system, or a frame rate, or a counting result of a hardware counter of the processor.

5. The computing system as claimed in claim 3, wherein:

the activation control logic and the strength control logic control the activation of the different graphics processor boosting modules based on scene moving information about a scenario movie displayed on the display.

6. The computing system as claimed in claim 5, wherein:

the activation control logic and the strength control logic control the activation of the different graphics processor boosting modules based on user hints.

7. The computing system as claimed in claim 6, wherein:

the user hints are obtained from a touch panel on the display.

8. The computing system as claimed in claim 6, wherein:

the activation control logic and the strength control logic control the activation of the different graphics processor boosting modules based on programmable hints; and the programmable hints are managed in a list wherein different applications are related to different parameter thresholds, and the parameter thresholds are provided to judge the system information, the user hints, or the scene moving information.

9. The computing system as claimed in claim 8, wherein:

the processor further executes the instructions retrieved from the code memory to provide an information analysis module and a control module that includes the activation control logic and the strength control logic;

the information analysis module is configured to analyze and judge the system information, the user hints, or the scene moving information based on the programmable hints; and according to an analysis result of the information analysis module, the control module selects the target modules to activate from the graphics processor boosting modules, controls activation timing of the target modules, and controls strength of the target modules.

10. The computing system as claimed in claim 9, wherein:

the control module issues on and off settings to the configuration interfaces to activate the target modules and control activation timing of the target modules; and the control module issues strength settings to the configuration interfaces to control strength of the target modules.

11. The computing system as claimed in claim 1, wherein:

the activation control logic and the strength control logic are implemented by a share library, or a driver module, or a process controlling a driver of the computing system.

12. The computing system as claimed in claim 1, wherein:

each of the configuration interfaces is implemented by a combination of callback functions, system variables, and configuration files.

13. The computing system as claimed in claim 1, wherein:

the first module is a shading rate control module and the second module is a resolution adjusting module;

the first heavy loading status is an extremely heavy loading status of the computing system that requires more system resources than a normal loading status of the computing system; and the second heavy loading status is a lightly heavy loading status of the computing system that requires more system resources than the normal loading status but fewer system resources than the extremely heavy loading status.

14. A method for graphics processor boosting, comprising:

providing a plurality of graphics processor boosting modules for a graphics processing unit of a computing system; and controlling activation of the different graphics processor boosting modules through different configuration interfaces with balances between the different graphics processor boosting modules by providing an activation control logic and a strength control logic;

wherein the activation control logic selects target modules to activate from the graphics processor boosting modules, and the strength control logic controls strength of the target modules;

wherein the target modules include a first module and a second module, wherein the first module provides a more significant adjustment to alleviate system loading and causes a more significant impact on display quality in comparison with the second module, and the second module provides a less significant adjustment and has a higher system overhead in comparison with the first module;

wherein in response to a first heavy loading status of the computing system, the strength control logic activates the first module at a stronger level in comparison with the second module; and wherein in response to a second heavy loading status of the computing system that requires fewer system resources than the first heavy loading status, the strength control logic activates the second module at a stronger level in comparison with the first module.

15. The method as claimed in claim 14, further comprising:

integrating analysis and judgment, based on programmable hints, of system information, user hints, or scene moving information before communicating with the graphics processor boosting modules through the configuration interfaces, wherein:

the system information is collected by a processor of the computing system;

the scene moving information is obtained from a scenario movie displayed on a display of the computing system; and the programmable hints are managed in a list wherein different applications are related to different parameter thresholds, and the parameter thresholds are provided to judge the system information, the user hints, or the scene moving information.

16. The method as claimed in claim 15, wherein:

the system information is power consumption information, or temperature information, or an operational frequency of the processor, or an operational frequency of the graphics processing unit, or an operational frequency of a system memory of the computing system, or a frame rate of the display, or a counting result of a hardware counter of the processor; and the user hints are obtained from a touch panel on the display.

17. The method as claimed in claim 15, further comprising:

issuing on and off settings to the configuration interfaces to activate target modules among the graphics processor boosting modules and controlling activation timing of the target modules; and issuing strength settings to the configuration interfaces to control strength of the target modules.

* * * * *